United States Patent [19]

Cullum, Jr. et al.

[11] 4,319,189
[45] Mar. 9, 1982

[54] MAGNETOACOUSTIC POSITION SENSOR EMPLOYING PULSE CODE SEQUENCE GENERATORS AND DETECTORS

[75] Inventors: Clifton D. Cullum, Jr., Putnam Valley; David A. Thompson, South Salem; Thomas K. Worthington, Tarrytown, all of N.Y.

[73] Assignee: International Business Machines Corporation, Armonk, N.Y.

[21] Appl. No.: 53,659

[22] Filed: Jun. 29, 1979

[51] Int. Cl.³ ............................................. G01B 7/14
[52] U.S. Cl. .................................................. 324/208
[58] Field of Search ............... 324/207, 208, 235, 252; 367/96, 117, 125, 127; 333/148; 73/597

[56] References Cited

U.S. PATENT DOCUMENTS

| 3,898,555 | 8/1975 | Tellerman | 324/34 D |
|---|---|---|---|
| 4,028,619 | 6/1977 | Edwards | 324/208 |
| 4,071,818 | 1/1978 | Krisst | 324/208 |
| 4,144,519 | 3/1979 | Chamuel | 324/208 |
| 4,170,754 | 10/1979 | Schmitz et al. | 324/208 |

FOREIGN PATENT DOCUMENTS

| 54-141157 | 1/1980 | Japan . |
| 55-23423 | 4/1980 | Japan . |
| 2016694 | 9/1979 | United Kingdom . |

OTHER PUBLICATIONS

Barker "Group Synchronizing of Binary Digital Systems", Communication Theory, 1953 London, pp. 273 to 287.

Primary Examiner—Gerard R. Strecker
Assistant Examiner—Walter E. Snow
Attorney, Agent, or Firm—Graham S. Jones, II

[57] ABSTRACT

Using a sonic delay line approach, the distance of a point from the ends of a wire is measured by the time required for an acoustic pulse to move along a wire. A magnetostrictive wire extends between its endpoints with several magnetic pickup coils connected in series located at each end of the wire which are adapted to pick up an encoded train of magnetoacoustic signals. A position signalling electromagnetic drive head can be moved along the coil to any desired position. The head can be pulsed electrically to produce an appropriate sequence of acoustic pulses in the magnetostrictive wire. When those pulses are received by an appropriate sequence of coils connected in series which are properly connected (plus and minus), a large pulse is produced at one time position of the waves as they pass through the sequence of coils. Otherwise, a small signal is produced while the pulses pass by. The drive head comprises a Barker sequence coil which produces 3, 7, or 11 pulses in a Barker sequence, which gives a maximum positive autocorrelation, with an output of less than zero for all other positions of the sequence of pulses as they pass through a series of coils. This large output signal is used in conjunction with a timer to provide position measurement. By placing detectors at both ends of the wire, it is possible to provide self-calibration against thermal and other drifts in accuracy and to provide immediate warning of noisy or invalid readings.

10 Claims, 9 Drawing Figures

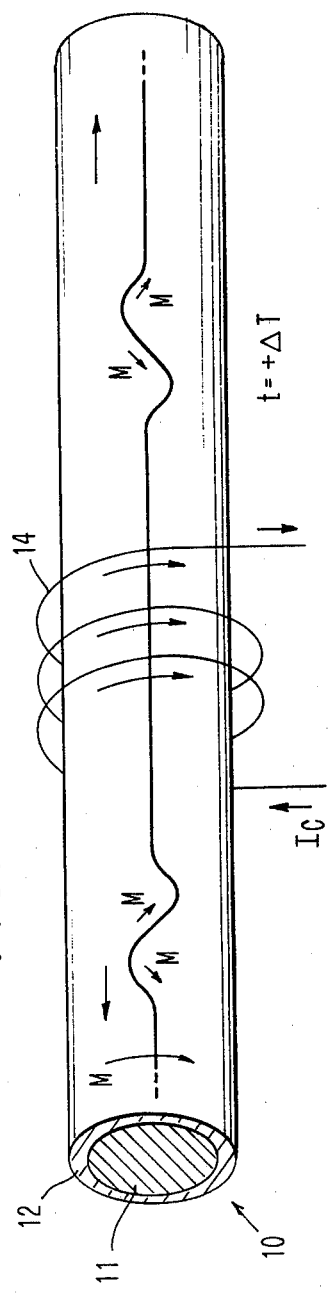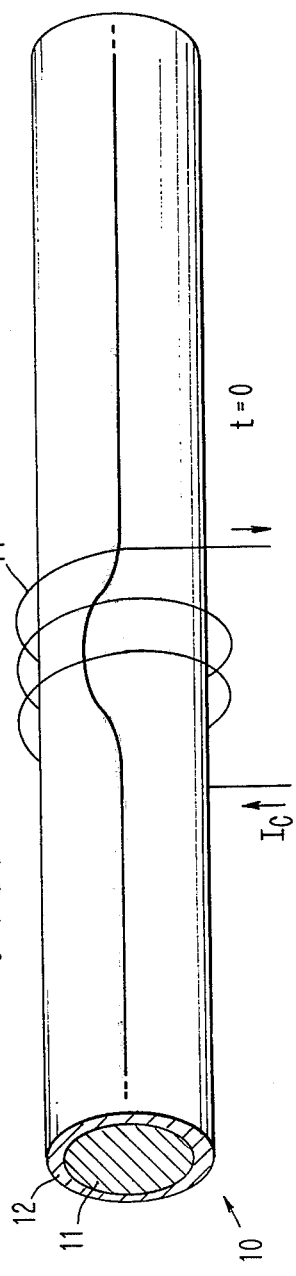

MAGNETOACOUSTIC POSITION SENSOR EMPLOYING PULSE CODE SEQUENCE GENERATORS AND DETECTORS

DESCRIPTION

1. Technical Field

This invention relates to the providing of an indication of the position of a movable member by means of magnetoacoustic pulses, and more particularly, to the means for generating the pulses and the means for receiving the pulses.

An object of this invention is to provide improved magnetoacoustic position sensors in which the position indicating signals on the line can be distinguished from noise.

Another object of this invention is to provide improved means for generating a position indicating signal so as to be insensitive to small defects in the magnetoacoustic member.

2. Background Art

U.S. Pat. No. 3,898,555 of Tellerman uses a sonic delay line to measure distance by use of magnetoacoustic pulses to measure distances along a magnetostrictive wire, but does not discuss any means of enhancing the signal's amplitude, such as a Barker sequence coil and a Barker sequence transmitter, nor does it discuss self-calibration and validity checking.

U.S. Pat. No. 4,071,818 describes a magnetoacoustic delay line sensor with a transmitter of a pulse from a fixed coil, a movable position indicating permanent magnet, and magnetic pulse sensors at each end of the magnetoacoustic delay line. In the past, Barker sequence coils have been employed in the field of information channels for transmitting signals with a high probability that the signal will be distinguished from noise. However, the concept of applying such a technique to position sensing is believed to be an entirely new one which combines two heretofore disparate technologies in a synergistic manner.

BRIEF DESCRIPTION OF THE DRAWINGS

In the accompanying drawings forming a material part of this disclosure:

FIG. 1A and FIG. 1B are perspective, partially sectional, schematic diagrams of a magnetoacoustic wire and an actuator coil wound helically about the wire, with FIG. 1B showing the wire at time t=0 and FIG. 1A showing the wire at time t=+Δt.

DISCLOSURE OF THE INVENTION

FIG. 1A shows a wire 10 composed of a (125 micrometer diameter) material such as beryllium-copper 11 electroplated or otherwise coated with a magnetostrictive thin film 12 such as $Ni_{50}Fe_{50}$ layer about 3 micrometers thick. The electroplating may be performed under tension with an applied longitudinal magnetic field along the direction of the wire axis. When the plating is completed, the tension is subsequently removed, which produces a compressional stress within the thin film 12 within which a circumferential magnetic anisotropy is accordingly induced.

A helical generator coil 14 is wound about plated wire 10. FIG. 1B shows the same wire 10 and coil 14 at time t=0 whereas FIG. 1A shows them at a later time +Δt. At time t=0 a current pulse $I_c$ with a duration of about 1 microsecond passes through coil 14 in the direction to initiate the torsional wave whose amplitude is shown in FIG. 1B, which at time +Δt in FIG. 1A produces the pictured orientation of the magnetization M.

The magnetic field from the generating coil rotates the magnetization away from its circumferential easy axis. Since the plating is magnetostrictive, this generates a strain in the wire. FIG. 1B shows the mechanical strain generated in wire 10 at t−0 by means of a line drawn on the surface, which was an undistorted straight line before the current pulse was applied.

Figure 2:
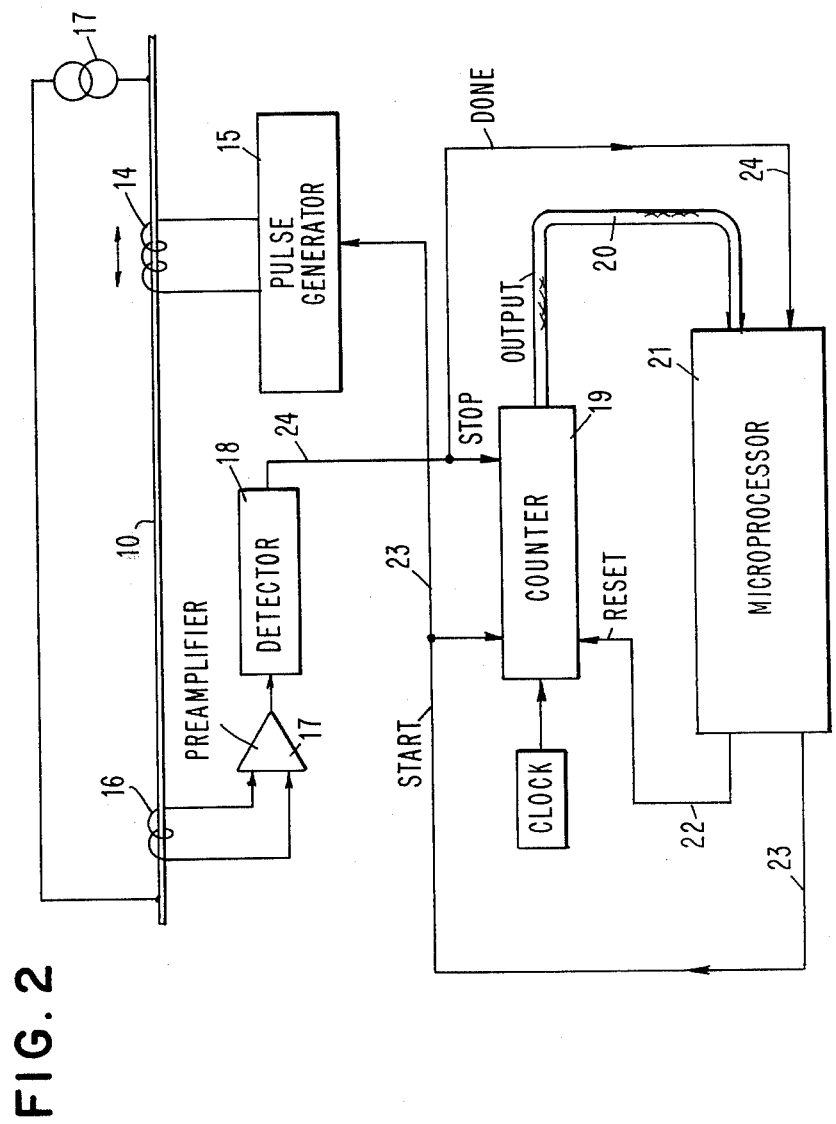
FIG. 2 shows the wire of FIGS. 1A and 1B connected to a system for detecting the position of the actuator coil along the length of the wire.

FIG. 2 shows the wire 10 with a pulse generator 15 connected to a movable drive coil 14 employed to generate a magnetoacoustic wave of the kind shown in FIG. 1A. The elastic wave travels along the wire 10, passing through the sensor coil 16. An electrical current bias is maintained in wire 10 by DC current source 17. The time required for the elastic wave to travel from the drive coil 14 to the sensor coil 16 is proportional to the distance between them, which provides an excellent position sensor. The system is controlled by a microprocessor 21 which initiates operation of the position sensor by resetting counter 19 and then sending a start signal out on line 23 to start counter 19 and the pulse generator 15. The counter 19 is a timer which begins at a value of zero and counts up until it receives an input on stop line 24 from the detector 18.

Start line 23 activates pulse generator 15 at the same time as counter 19 so that an elastic wave is propagating along wire 10 while corner 19 is counting the time it requires the magnetoelastic wave to travel down the line 10. When the elastic wave passes through the sense coil 16 a voltage is induced in sense coil 16 which is amplified by preamplifier 17. The detector 18 generates a signal when the voltage reaches its maximum (or minimum) value. This signal is sent via wire 24 to stop the counter 19. The output value on lines 20 to the microprocessor 21 from counter 19 indicates to the microprocessor what the time delay was between the start signal and the sensing of the passing of the elastic wave through the coil 17. The microprocessor 21 receives an input from line 24 indicating that the measurement by the counter has been completed so that it can calculate the position.

Figure 3:
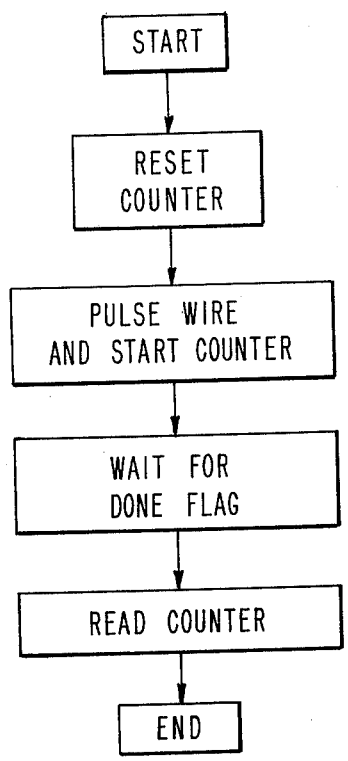
FIG. 3 is a flow chart which shows the operations performed by the microprocessor of FIG. 2.

FIG. 3 shows the control sequence of the program which the microprocessor employs to control the counter and the pulse generator and to make the appropriate measurements.

Figure 4:
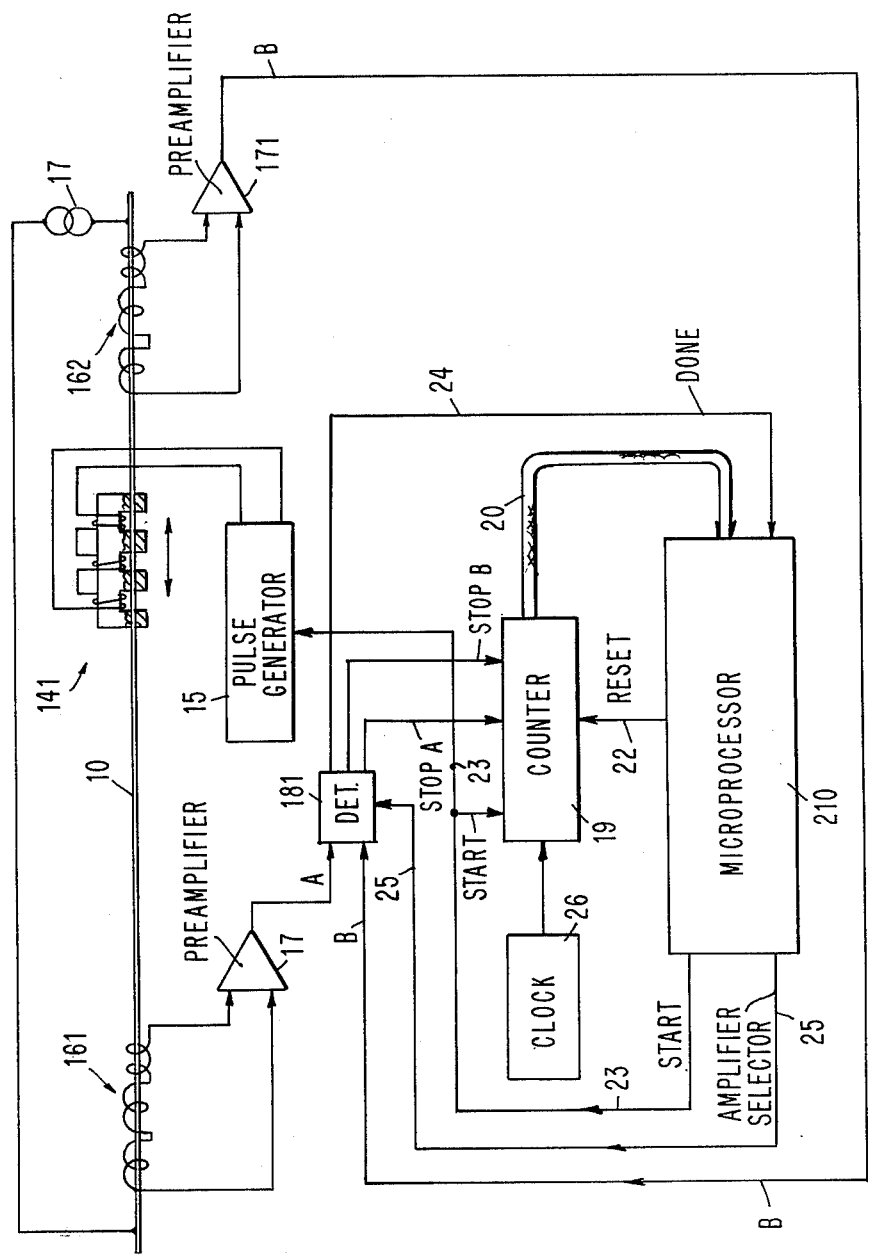
FIG. 4 is a modified system in accordance with FIG. 2 with the additional feature of having sense coils at each end of the magnetoacoustic wire and a Barker sequence arrangement for both the actuator and the detector sensors.

In FIG. 4 an additional sense coil 162 is located at the opposite end of the wire 10 from the modified sense coil 16 shown as coil 161. The use of the additional sense coil 162 can permit improved accuracy of measurement of the value by permitting calibration of the speed of transmission of the pulse as a function of temperature or other variables in the wire and can permit the measurement of the ratio of displacements, since measurements of time delay can be made from both ends. The sum of the time delays between the moving pulse generator coil 141 and the two sense coils 161 and 162 is a constant, representing the time required for the elastic wave to travel the total distance between those sense coils, for any given temperature. If both delays are monitored, variations in the speed of propagation with temperature or by aging, thermal expansion of the wire, and drift of the system clock are all capable of being compensated for by the system. A preferred embodiment shown uses a switched detector 181 which alternates between the two sense coils 161 and 162 on successive start pulses.

Figure 5:
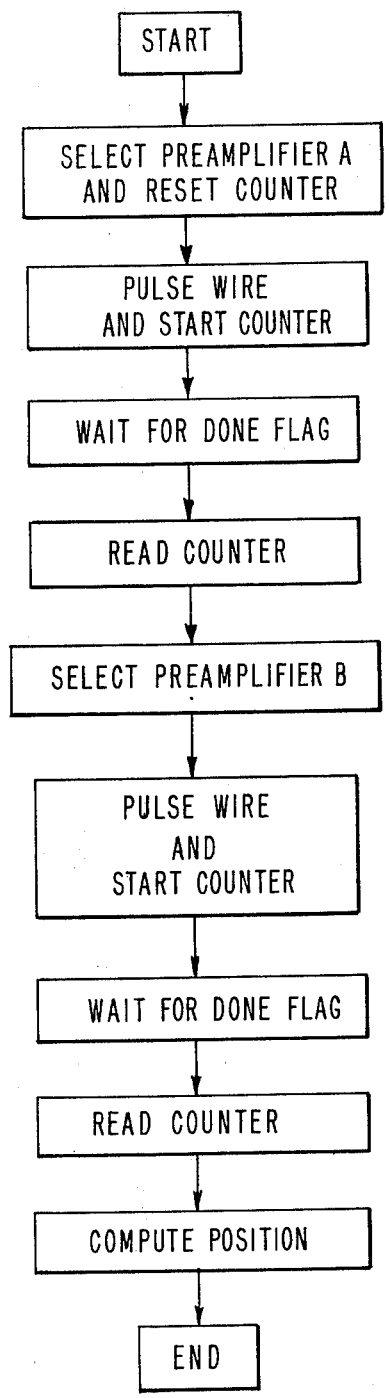
FIG. 5 shows the flow chart of the microprocessor in FIG. 4.

Referring to FIG. 5, the microprocessor 210 selects preamplifier A on line 25 connected to detector 181 and sends a reset signal on line 22 to reset the counter to zero. Then the microprocessor 210 pulses line 23 to start the counter 19 and pulse generator 15 which generates an elastic wave in the wire 10. Counter 19 accumulates pulses from clock 26 during the time required for the elastic wave to travel from the generator 15 to coil 161. When the elastic wave arrives, detector 181 generates a signal to stop counter 19 and to signal microprocessor 210 on line 24 that the measurement is done. Then, the microprocessor 210 reads the output on line 20 from the counter 19. The next step in FIG. 5 is that the microprocessor 210 turns on the line 25 to select preamplifier 171 and signal line B. Again, the microprocessor sends out a signal on start line 23 to restart counting of counter 19, which has not been reset, and to operate the input to pulse generator 15 which generates a new elastic wave on line 10. Since coil 162 has been selected, counter 19 counts clock pulses until stopped by the arrival of the elastic wave at coil 162. Line 24 signals this and microprocessor 210 now reads the output of the counter 19. Since the counter was not reset, this value is proportional to the length of wire 10, except if coil 141 was moved for any significant distance in the period between the generation of the two elastic waves.

Thus, the system has the capacity to reject noisy or imperfect measurements as being outside of the possible range of values. When employed to sense the motion of automatic devices such as a linear drive, this can assure that the generation of spurious data does not permit a drive arm to operate out of control and ram through a wall, as it were. The change in sum with velocity can be employed as a direct measurement of velocity, or if dynamic recalibration is being employed, it can be compensated for by the velocity deducted from data taken from the first coil 161 in the next measurement cycle.

FIG. 4 also illustrates an embodiment in which only a single generating pulse is used, and the resulting waves are sensed by both coils 161 and 162. In this case, the detector 181 and counter 19 contain dual elements, so that the counter 19 obtains both counts simultaneously. The detector 181 produces the done signal when both pulses have been detected, and the microprocessor 210 receives both counts through cable 20. Analysis by the microprocessor is similar to that described above.

Another aspect of FIG. 4 is the use of coils or heads with multiple windings connected in series. When such a generating head is energized, torsional elastic waves are created under each section of the head simultaneously. The chirality of each wave corresponds to the polarity of the field produced by the winding above it. This group of elastic waves propagates in both directions along the wire. As this group passes through a pickup coil, a sequence of output pulses is generated. If the pickup coil consists of a set of coils connected in series with equal spacing and chirality to the generating head, the sequence of output pulses is the autocorrelation function of the function describing the set of coils. In the discussion below, we will describe embodiments using the sequences known as Barker sequences (R. H. Barker, "Group Synchronizing of Binary Digital Systems," Communication Theory, London (1953) pp. 273–287). Barker sequences have autocorrelation functions which alternate between a zero and minus one except when the sequence of travelling waves exactly overlaps the pickup coil. At that instant its value is N where N is the number of coils in the sequence. N can be equal to 3, 7, or 11. This feature of Barker sequences makes them particularly useful for improving the signal-to-noise ratio of our position sensor. Another feature of these sequences is that the elastic waves are generated over a relatively long length of the wire. If there are small defects in the magnetostrictive plating, the signal will be somewhat distorted, but still detectable, whereas if a single small coil were employed, the signal would be absent.

Although the Barker sequences are optimal in some circumstances (binary, small N), there are many other sequences which provide the stated advantages to some degree. In addition, it could be advantageous to use different sequences for generating and receiving transducers. Nonbinary sequences, i.e., different field strengths or numbers of terms can be used. A sequence of waves can also be produced by multiple pulsing of a single generating transducer, and the effect of multiple sense coils can be obtained with a single coil and a transversal (delay) filter, although the spatial averaging advantage is lost.

Figure 6:
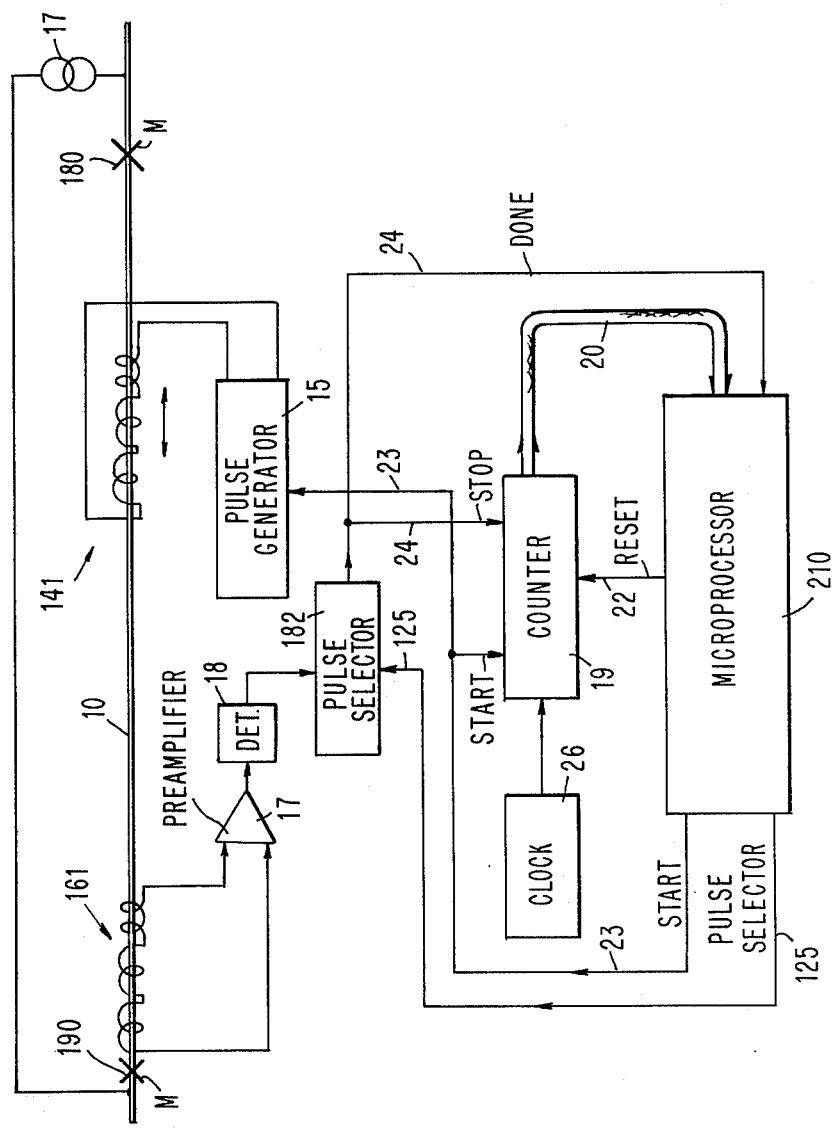
FIG. 6 shows still another modification of the system of FIG. 2 which utilizes the initial pulse plus reflections of the initial pulse from ends of the wire.

FIG. 6 shows a system for measuring the length of the wire while measuring the position of the movable generator head 141 which is wound in accordance with the Barker sequence as is the pickup coil 161. At each end of the wire 10 is an acoustic termination 180 or 190, which can reflect an acoustic wave or damp it without reflection. Each time head 141 is pulsed, two waves are generated as shown in FIG. 1A, one travelling to the left and one travelling to the right. The one travelling to the left reaches the pickup coil first as it measures a time $T = S/v$ where S is the distance from the generator to the second sensor and v is the velocity of propagation. The wave moving to the right follows a more complicated path. When it reaches the right end 180 of wire 10, it is reflected by mass M and then travels along wire 10 to the pickup coil, but this reflection has been reversed in sequence as it passes through the sequence coils which are arranged to receive the original sequence so that the correlation function in the coil 161 may yield a different signal. The pulse may be detected then, or after it reflects off the left-hand end, again being reversed into the original sequence of pulses. When the doubly reversed sequence of pulses reaches the coil 161, it is in the original sequence and correlates in coil 161 in accordance with the original sequence. Thus, a large spike of voltage is produced at that time.

For the two-reflection case, the microprocessor can compute a time corresponding to twice the length of the wire by summing the times for direct and multiply-reflected pulses. It can be used in the same way as in the system with two pickup coils in FIG. 4 to check the validity of data or to correct for drifts in values. In addition to requiring only one pickup coil 161 and one preamplifier 17, this system is independent of the velocity of the drive head 141 as it travels along wire 10.

For the one-reflection case, sequences are available, such as $+ + - + - -$, which produce almost as large a signal enhancement as the Barker sequence, but which produce as large an output for the reversed sequence, eliminating the need for a second reflection, and hence allowing damping at one end to quiet the wire more quickly for subsequent measurements.

Figure 7:
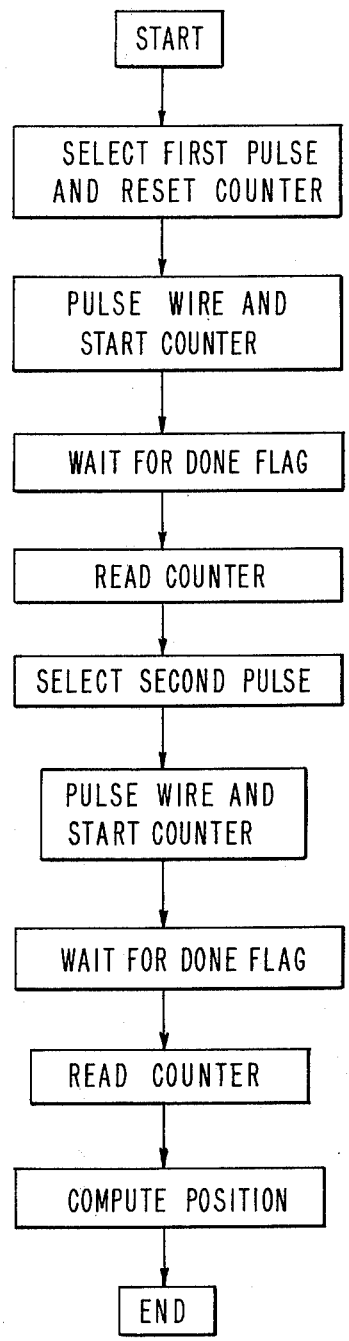
FIG. 7 shows the flow chart of the microprocessor for the system of FIG. 6.

Referring to FIG. 7, the sequence of operation of the microprocessor 210 in FIG. 6 for the double reflection case is shown there. First, an output on pulse selector line 125 activates pulse selector 182 to be ready to detect the arrival of the first pulse it receives. At the same time, a signal on reset line 25 resets counter 19. As soon as that step is completed, the microprocessor 210 generates a start pulse on line 23 which pulses the wire 10 via generator 15 and head 141.

Simultaneously, line 23 also starts counter 19, as usual. When the pulse selector 182 receives a pulse from sensor coil 161 and preamplifier 17, an output is generated on line 24 which sends a done signal on line 24 to stop counter 19 and to indicate to the microprocessor 210 that the reception of the first pulse has been completed. Then, the counter is read by the connection on cable 20. Then, line 125 is energized with a different signal to activate selector 182 again, but in this case for responding to the second (reflected) pulse to be received by coil 161 when it has been reflected at left end 190 of the wire 10. Again line 23 is activated as before with the same result of restarting the counter 19 and generating an elastic wave from head 141 which in this case will be read when it reflects off end 190. Again, the system waits for the output on line 24 which comprises the done flag and which stops the counter. Then the counter is read again and the two values are used to compute the position of the head 141.

Figure 8:
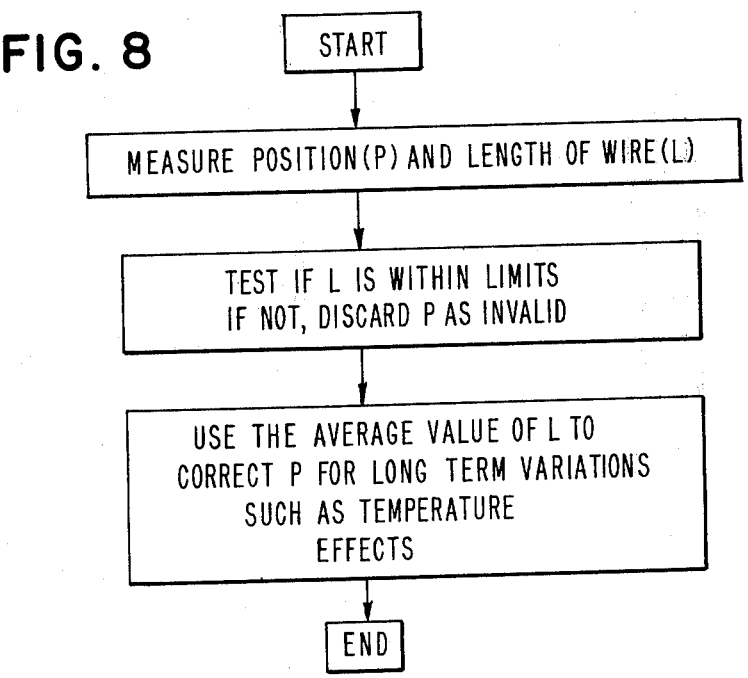
FIG. 8 shows the flow chart of the microprocessor for signal validity verification.

FIG. 8 shows a flow chart for the purpose of verification of the validity of the data by the microprocessor employed. The technique involves measuring the position (P) of the generating coil on the head and the length (L) of the wire. Next the processor must test to determine whether L is within the limits of the known length of the wire and if not, discard the value P as invalid because the data must be invalid. Next, the average value of L is used to correct for long term variations in parameters such as variation in length as a function of temperature, or for the statistical advantage of averaging.

Multiple generating coils minimize the effects of wire imperfections on the output. For a simple incremental encoder, this would take the form of an array of coils of alternating polarity spaced $\frac{1}{2}$ wavelength apart to replace the moving coil in the system and excited by a continuous sine wave or burst. The receiving coil may also be such an array. The resulting output may be compared in phase with the original clock to produce high resolution incremental encoding. For absolute encoding, the sending and receiving arrays are arranged in a Barker sequence to produce a large amplitude single pulse with all the benefits of spatial and time averaging that such sequences can produce.

Although we have found it advantageous to make the moving transducer the generating transducer in the embodiments shown, it is obvious that two generators and one detector can be used in a scheme similar to that of FIGS. 4 and 5. Although we have shown the transducers to be coils wound around the wire 10, it is often convenient to have transducers which do not encircle the wire. We use a transducer similar to a recording head for this purpose, with multiple gaps perpendicular to the wire.

Advantages of the present system are as follows:
1. Plated wire is inexpensive to produce.
2. The magnetic layer in the plated wire is thin ($\sim 3\mu$) so that the losses associated with eddy current damping are small. This allows long position sensors to be constructed.
3. The moving head need not encircle the wire, making support of the system simple.
4. The pulsed magnetic field is applied over only a small section of the wire so the signal-to-noise ratio is excellent.
5. The existence of the circumferential anisotropy allows one to detect only torsional waves, which allows use of a simple pickup coil as the sensing element rather than a complicated mode conversion system.
6. The small size of the system and the use of inexpensive transducers allow construction of multipole transducers arranged in Barker sequences. Linearity, resolution, and reliability are improved by the use of multiple section coils, such as the Barker sequence coils, which improve signal-to-noise ratio and minimize the effects of individual wire defects.
7. Self-calibration and reliability features obtained by the use of two sense coils and associated logic circuitry represent a significant performance advantage.

Industrial Applicability

This invention is adapted to position measurement where position data must be collected for use in control of automatically controlled mechanical devices such as linear drives, where accuracy and reliability of position is of great importance. The system of this invention is particularly useful in connection with computer control of remote devices producing variable motion as a function of variable output signals.

While this specification illustrates and describes the preferred embodiments of the subject invention, it is to be understood that the invention is not limited to the precise implementation and construction details described herein. The right is reserved to all changes and modifications encompassed by the scope of the underlying invention as defined in the claims which follow.

Having thus described our invention, what we claim as new and desire to secure by Letters Patent is:

1. In an acoustic pulse delay line system for measuring the distance along a magnetostrictive wire from a first point on said wire to a second point on said wire including means for measuring the time required for a pulse to move between said points with a magnetoacoustic pulse generator at said first point and a magnetoacoustic pulse sensor at said second point, the improvement comprising said pulse generator including means for periodically generating a specific sequence of code pulses and including a plurality of coils connected in series with varying degrees of chirality and connected to a source of a timing pulse, and said sensor including a code detector including a plurality of coils with matching chirality connected to match said coils in said pulse generator for detecting said specific sequence of code pulses from said generator, said sequence of code pulses when detected thereby providing a high degree of discrimination between said sequence of code pulses and noise signals.

2. A system in accordance with claim 1 wherein means are provided for self-calibration and checking of the accuracy of measurement of positions along said wire.

3. A system in accordance with claim 1 wherein a sequence of pulses varying in a predetermined way is generated at said pulse generator and said sensor is adapted to decode said sequence in an additive way to produce an enhanced signal.

4. A system in accordance with claim 1 wherein said pulse generator comprises a Barker sequence generator and said sensor comprises a Barker sequence element adapted to enhance the amplitude of the signal from said generator.

5. A system in accordance with claim 1 wherein said wire includes means for reflecting acoustic pulses propagating along said wire at each end thereof, and said sensor being adapted to detect pulses from said generator directly and reflected from both ends successively, and discriminating against pulses reflected from only one end of said wire.

6. A system in accordance with claim 1 wherein said means for measuring includes processing means for controlling the production of pulses by said pulse generator and means for clocking the interval of time required for a pulse to travel along said wire.

7. A system in accordance with claim 4 including sensor means at each end of said wire and means for alternately detecting the time required for a pulse to travel in either direction along said wire from said generator, said means for alternately detecting operating on a time-shared basis for pulses travelling in opposite directions, one at a time, and means for processing the time duration information derived from said pulses travelling in opposite directions to derive and to indicate position information.

8. A system in accordance with claim 4 wherein said wire includes means for reflecting acoustic pulses at each end of said wire, and said system includes means for determining the time required for a pulse to travel directly to said sensor from said generator and means for determining the time required for a pulse to travel to the distal end from said sensor of said wire, reflect, rebound to the proximal end of said wire with respect to said sensor and then be detected by said sensor while discriminating against pulses reflected by only said distal end or said proximal end.

9. In a acoustic pulse delay line system for measuring the distance along a magnetostrictive wire from a first point on said wire to a second point on said wire with means for measuring the time required for a pulse to move between said points connected to a magnetoacoustic pulse generator at said first point and a magnetoacoustic pulse sensor at said second point, the improvement comprising said pulse generator including means for periodically generating a specific sequence of code pulses and including a plurality of coils connected in series with varying degrees of chirality and connected to a source of a timing pulse, an additional magnetoacoustic sensor at a third point providing an additional input to said means for measuring wherein said generator and said sensors each include a code detector including a plurality of coils with matching chirality connected to match said coils in said pulse from said generator, and an electronic logic system wherein means are provided for self-calibration and checking of the accuracy of measurement of positions along said wire by sequentially and successively connecting said sensors to said means for measuring.

10. A system in accordance with claim 9 including said sensors with said first and third points at opposite ends of said wire and means for alternately detecting the time required for a pulse to travel in either direction along said wire from said generator, said means for alternately detecting being connected to said sensors and operating on a time-shared basis for pulses travelling in opposite directions, one at a time, and means for processing the time duration information derived from said pulses travelling in opposite directions to derive and to indicate position information.

* * * * *